United States Patent [19]

Biskup

[11] 3,828,882
[45] Aug. 13, 1974

[54] STEERING MECHANISM FOR ARTICULATED VEHICLE

[75] Inventor: Edward J. Biskup, Birmingham, Mich.

[73] Assignee: General Motors Corporation, Detroit, Mich.

[22] Filed: Aug. 24, 1973

[21] Appl. No.: 391,492

[52] U.S. Cl.............. 180/79.2 B, 180/14 R, 180/51
[51] Int. Cl............................................. B62d 5/06
[58] Field of Search............... 180/79.2 B, 51, 14 R; 244/50

[56] References Cited
UNITED STATES PATENTS
2,930,547 3/1960 Hogan.................................. 244/50
3,338,329 8/1967 Orth............................... 180/79.2 B Primary Examiner—Lloyd L. King
Assistant Examiner—Randolph A. Reese
Attorney, Agent, or Firm—Edward J. Biskup

[57] ABSTRACT

A steering mechanism for an articulated vehicle including first and second frame sections between which a pair of hydraulic steering cylinders extend that are connected to the frame sections by pivotal connections located on a common circle. The mechanism is provided with steering cylinder stabilizing means formed integrally with the two frame sections of the vehicle.

3 Claims, 4 Drawing Figures

STEERING MECHANISM FOR ARTICULATED VEHICLE

This invention concerns a steering mechanism for vehicles comprising interconnecting frame sections and more particularly a steering mechanism for self-propelled scraper vehicles of the type having a tractor drawn scraper bowl in which the tractor and scraper bowl are interconnected for relative movement about a vertical steer axis.

In scraper constructions of the above-described type, it is desirable to have a steering mechanism of rugged and simple construction that connects the two frame sections of the vehicle and provides a substantially constant mechanical advantage throughout the complete range of steering movement of the vehicle. One form of steering mechanism that is intended to fulfill these requirements includes one or a pair of hydraulic steering cylinders in which each of the steering cylinders has the piston rod member and the cylinder member respectively pivotally connected to the two frame sections of the scraper vehicle at points located on a common circle. The arrangement is such that when the vehicle is fully steered to one side or the other side of a straight-ahead aligned position, the pivotal connections of the piston rod member and the cylinder member of one of the hydraulic steering cylinders becomes axially aligned resulting in the cylinder member being unstable. In order to correct this problem in steering mechanisms utilizing one steering cylinder, it has been common to provide a link which through a lost-motion connection maintains the cylinder member in a predetermined position relative to the vehicle so as to assure that continued steering ability is maintained. In the case of steering mechanisms using a pair of steering cylinders, a link has been used to interconnect the cylinder members of the two steering cylinders so that both cylinders are properly positioned. As should be apparent, however, the use of link members to correct the problem increases the cost of the mechanism due to the added parts required and the expense of the machining necessitated by the additional pivotal connections.

Accordingly, the principal object of the present invention is to simplify the design of the above-described type of steering mechanism by eliminating costly parts which heretofore have been considered necessary for the mechanism to operate properly. Another object of this invention is to provide a steering mechanism for an articulated vehicle having a pair of frame sections between which a pair of hydraulic steering cylinders are connected by pivotal connections located on a common circle with the frame sections having cylinder stabilizing means which are formed integrally therewith.

The above objects and others are realized with a steering mechanism that is incorporated with an articulated vehicle having first and second frame sections pivotally interconnected for relative steering articulation about a vertical steer axis. The steering mechanism includes a pair of double-acting hydraulic steering cylinders each of which includes a piston rod member and a cylinder member. A mounting member is rigidly connected to the forward end of the cylinder member of each steering cylinder and a first pivotal connection supports the mounting member on the first frame section. A second pivotal connection, which is laterally spaced from the first pivotal connection, supports the mounting member employed with the other steering cylinder on the first frame section. The piston rod members of the two steering cylinders are connected by third and fourth pivotal connections to the second frame section in a manner so that the centers of all the pivotal connections are located on a common circle. In addition, integral stop means are formed with both frame sections for alternately engaging the mounting member of each steering cylinder so as to maintain the latter in a fixed position relative to the other steering cylinder when the first and third pivotal connections and second and fourth pivotal connections are axially aligned.

A more complete understanding of the invention will be derived from the following detailed description when taken with the drawings in which.

Figure 1:
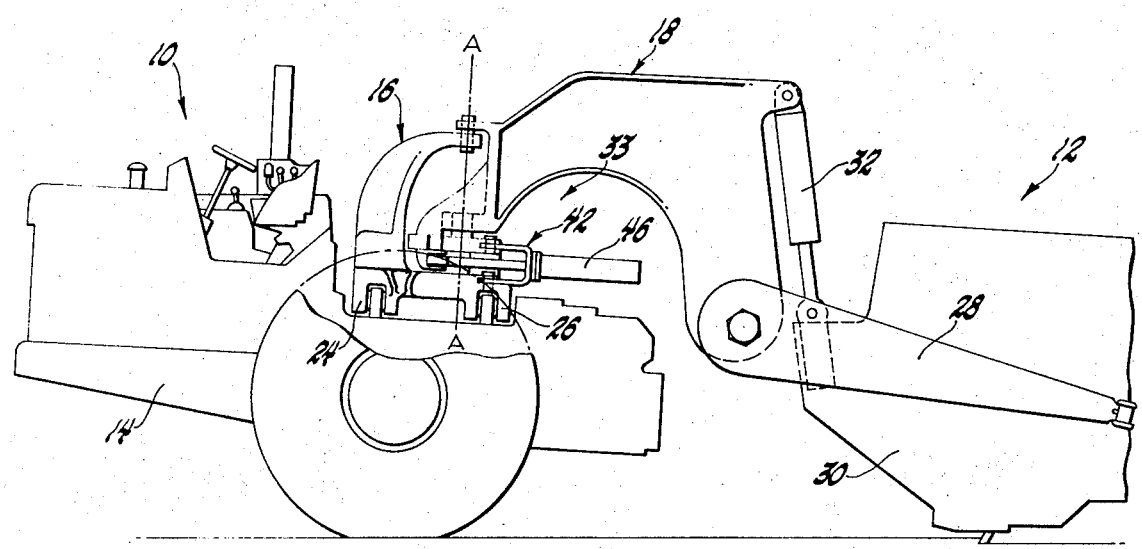
FIG. 1 is an elevational view showing an articulated scraper vehicle incorporating a steering mechanism made according to the invention.

Referring to the drawings and more particularly FIG. 1 thereof, an off-highway earthmoving vehicle is shown comprising an overhung wheeled tractor 10 and a trailing scraper bowl 12. The tractor 10 includes a frame 14 and is joined to the scraper bowl 12 through a hitch comprising an L-shaped steering frame 16 which is hingedly connected to a pull yoke frame 18 for relative steering articulation about a vertical steer axis A—A defined by an upper king pin 20 and a lower king pin 22. As is conventional with vehicles of this type, the steering frame 16 is carried by the tractor 10 at a point located above the rotational axis of the tractor drive wheels and is connected to the tractor frame 14 by a pair of axially aligned and horizontally oriented pivot connections 24 and 26 which permit the tractor 10 to oscillate about a longitudinally extending axis so as to permit the vehicle to traverse irregular terrain.

The pull yoke frame 18 includes a gooseneck that is formed by a pair of diverging arms (not shown) which extend rearwardly and downwardly for integral connection with a transverse torque tube. The opposite ends of the torque tube rigidly carry rearwardly extending and laterally spaced pull arms one of which is indicated by the reference numeral 28. Each pull arm 28 is connected to the side wall 30 of the trailing scraper bowl 12 for supporting the latter in the usual manner for movement about a transverse horizontal axis. In this regard, a suitable hydraulic bowl cylinder 32 extends between an upper portion of the gooseneck and the forward end of the scraper bowl 12 for positioning the latter between a lowered dig position and a raised position.

Figure 2:
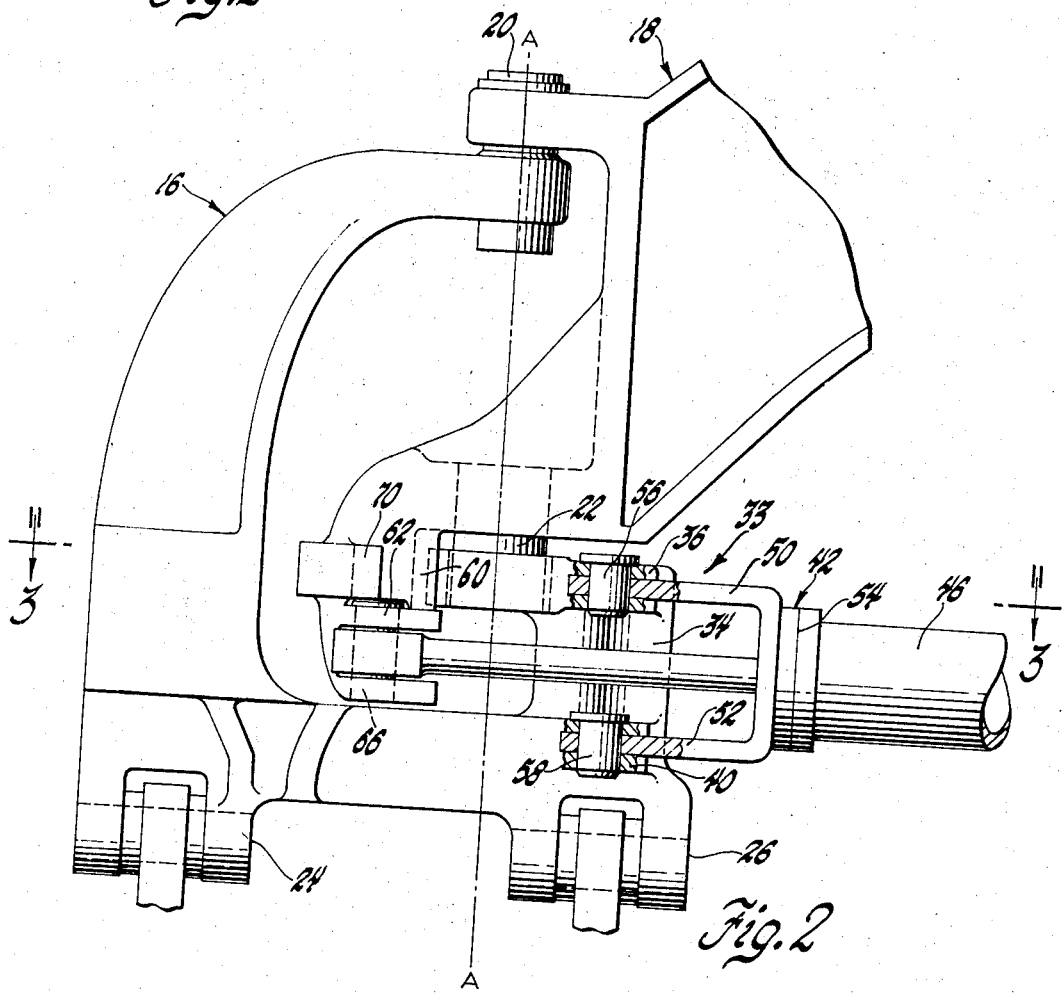
FIG. 2 is an enlarged view of the steering mechanism and shows the manner that it is combined with the hitch.
Figure 3:
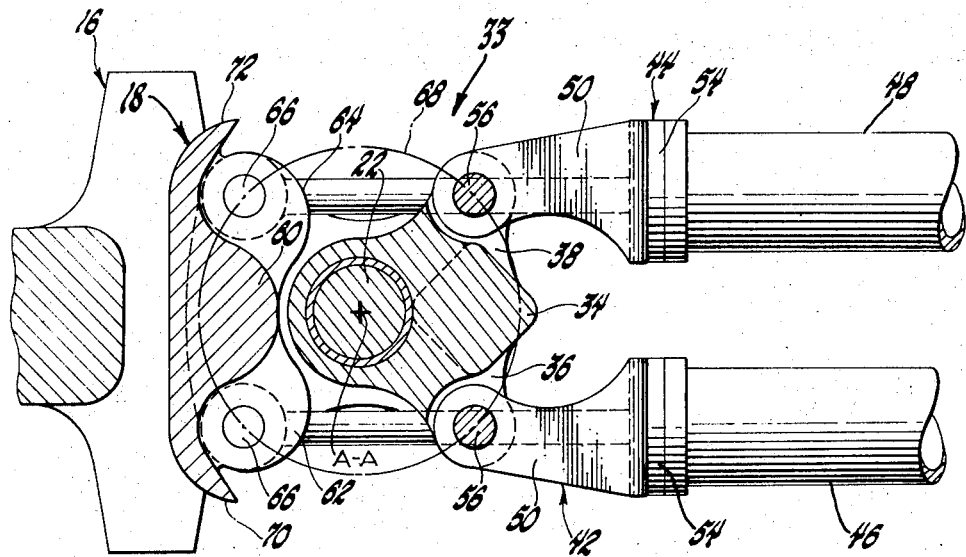
FIG. 3 is a view taken on line 3—3 of FIG. 2 and shows the relative position of the steering cylinders when the scraper vehicle is in a straight-ahead position.

Relative steering articulation of the above-described vehicle is realized through a steering mechanism 33 which is incorporated with the steering frame 16. In this regard and as seen in FIGS. 2 and 3, the rearward end of the steering frame 16 is integrally formed with an upstanding boss 34 having laterally extending ears 36 and 38 formed therewith. A similar pair of ears, one of which is indicated by reference numeral 40, are integrally formed with the base of the steering frame 16 below the ears 36 and 38 and together with the latter serve as vertically aligned mounting points for a pair of mounting members 42 and 44 which respectively support double-acting hydraulic steering cylinders 46 and 48.

Each mounting member 42 and 44 is U-shaped, as seen in FIG. 2, having a horizontal upper arm 50 and a horizontal lower arm 52 integrally formed with a cylindrical base 54. The base 54 is fixedly connected to the forward end of the cylinder portion of the associated steering cylinder while the arms 50 and 52 are pivotally mounted to the vertically spaced ears by vertically aligned pins 56 and 58. The piston rod of each steering cylinder extends forwardly between the arms 50 and 52 of the mounting member for pivotal connection with a depending portion 60 integral with the gooseneck. Thus, as seen in FIG. 3 the portion 60 has laterally outwardly extending ears 62 and 64 which serve as connecting points for the piston rods each of which is pivotally joined to the gooseneck by a vertically extending pin 66.

Figure 4:
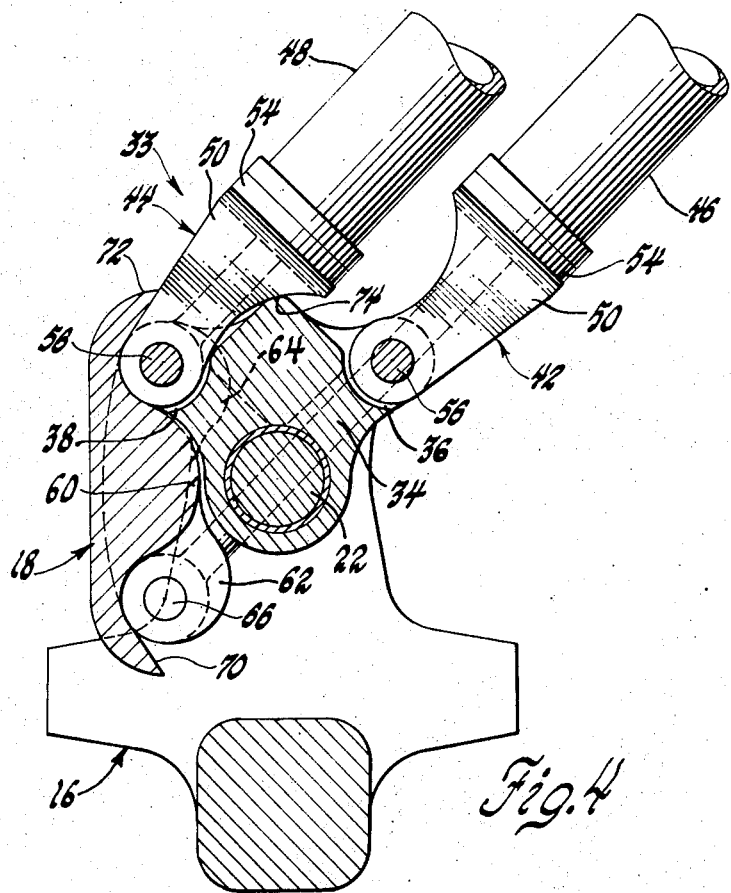
FIG. 4 is a view similar to FIG. 3 but shows the relative positions of the various parts of the steering mechanism when the scraper vehicle is in a full 90° turn.

It will be noted that, as seen in FIG. 3, the centers of the pivot pins 56 joining the mounting members 42 and 44 to the steering frame 16 and the centers of the pivot pins 66 joining the piston rods to the gooseneck are all located on a common circle 68 having the steer axis A—A as its center. Accordingly, as seen in FIG. 4, upon expansion of the steering cylinder 46 and contraction of the steering cylinder 48, the tractor 10 is rotated relative to the trailing bowl 12 about the vertical steer axis A—A to one side of a straight-ahead position. A full locked turn is realized when the tractor 10 is positioned at an angle of 90° relative to the trailing scraper bowl 12, and in this position, the centers of the pivot pins 56 and 58 of the mounting member 44 and the center of pivot pin 66 of the piston rod of the steering cylinder 48 become axially aligned along a vertical axis. In order to prevent the steering cylinder 48 from being freely rotationable and therefore unstable about the aligned pivot pins, the gooseneck at the forward end thereof above portion 60 is provided with a pair of stop members 70 and 72. The stop members 70 and 72 are horizontally aligned with the upper arms 50 of the mounting members 42 and 44 and serve to contact the latter alternately for maintaining the steering cylinders in parallel relationship. More specifically and as best seen in FIG. 4, as the tractor 10 reaches the 90° position, the stop member 72 engages the arm 50 of mounting member 44 and at the same time the inner portion of the arm 50 engages the boss 34 formed with the steering frame 16 at a point 74. In this manner, the steering cylinder 48 is restrained from movement and maintains a fixed position with its longitudinal axis normal to a straight line passing through the centers of the steer axis A—A and the pin 56 and therefore is properly positioned for expanding movement to return the tractor 10 to the straight-ahead aligned position with the scraper bowl 12. It should be apparent that when the tractor 10 is steered in the opposite direction a similar stabilizing effect occurs with respect to the steering cylinder 46 when it is trapped between the stop member 70 and the boss 34.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. A steering mechanism for an articulated vehicle including first and second frame sections pivotally interconnected for relative steering articulation about a vertical steer axis, a pair of double-acting hydraulic steering cylinders each having a piston rod member and a cylinder member, a mounting member rigidly connected to the cylinder member of each of said steering cylinders, a first pivotal connection supporting the mounting member of one of said steering cylinders on the first frame section, a second pivotal connection spaced from the first pivotal connection supporting the mounting member of the other of said steering cylinders on the first frame section, a third pivotal connection joining the piston rod of said one of said steering cylinders to said second frame section, a fourth pivotal connection spaced from the third pivotal connection joining the piston rod of said other of said steering cylinders to the second frame section, the centers of said first, second, third and fourth pivotal connections being located on a common circle so when the first frame section is positioned at a predetermined angle relative to the second frame section in one direction about the vertical steer axis the centers of the first and third pivotal connections are axially aligned along a vertical axis and when the first frame section is positioned in the opposite direction about the vertical steer axis relative to the second frame section at an angle equal to said predetermined angle the second and fourth pivotal connections are axially aligned along a vertical axis, and stop means formed with said first and second frame sections for alternately engaging the mounting members of said steering cylinders for maintaining each of said steering cylinders in a fixed position relative to the other steering cylinder when the first and third pivotal connections are vertically aligned and when said second and fourth pivotal connections are vertically aligned.

2. A steering mechanism for an articulated vehicle including first and second frame sections pivotally interconnected for relative steering articulation about a vertical steer axis, a pair of double-acting hydraulic steering cylinders each having a piston rod member and a cylinder member, a mounting member rigidly connected to the forward end of the cylinder member of each of said steering cylinders, a first pivotal connection supporting the mounting member of one of said steering cylinders on said first frame section, a second pivotal connection spaced from the first pivotal connection supporting the mounting member of the other of said steering cylinders on said first frame section, a third pivotal connection joining the piston rod of said one of said hydraulic cylinders to said second frame section, a fourth pivotal connection spaced from the third pivotal connection joining the piston rod of said other of said steering cylinders to the second frame section, the centers of said first, second, third and fourth pivotal connections being equally spaced along a common circle having the vertical steer axis as its center so when the first frame section is positioned at a 90° angle relative to the second frame section in one direction about the vertical steer axis the centers of the first and third pivotal connections are axially aligned along a vertical axis and when the first frame section is positioned relative to the second frame section at the same angle in the opposite direction about the vertical steer axis the second and fourth pivotal connections are axially aligned, and a pair of stop members integrally formed with and projecting outwardly from said second frame section for alternately engaging the mounting members of said steering cylinders and cooperating with said first frame section for maintaining each of said steering cylinders in a fixed position relative to the other steering cylinder when the first and third pivotal connections are vertically aligned and when the second and fourth pivotal connections are vertically aligned.

3. A steering mechanism for an articulated scraper having a steering frame and a pull yoke frame pivotally interconnected for relative steering articulation about a vertical steer axis, a pair of double-acting hydraulic steering cylinders each having a piston rod member and a cylinder member, a mounting member having upper and lower arms rigidly connected to the forward end of the cylinder member of each of said steering cylinders, first pivot means supporting the arms of the mounting member of one of said steering cylinders on said steering frame for pivotal movement about a first axis, second pivot means spaced from the first pivot means supporting the mounting member of the other of said steering cylinders on said steering frame for pivotal movement about a second axis, third pivot means joining the piston rod of said one of said steering cylinders to said pull yoke frame for pivotal movement about a third axis, fourth pivot means spaced from the third pivot means for joining the piston rod of said other of said steering cylinders to the pull yoke frame for pivotal movement about a fourth axis, said first, second, third and fourth axes being parallel to each other and equally spaced along a common circle having the vertical steer axis as its center so when the steering frame is positioned at a 90° angle relative to the longitudinal axis of the scraper in one direction about the vertical steer axis the first and third axes are axially aligned and when the steering frame is positioned in the opposite direction about the vertical steer axis at a 90° angle relative to said longitudinal axis the second and fourth axes are axially aligned, and a pair of stop members integrally formed with and projecting laterally outwardly from the pull yoke frame for alternately engaging the mounting members of said steering cylinders and cooperating with a portion of the steering frame to maintain each of said steering cylinders in a fixed position relative to the other steering cylinder when the first and third axes are vertically aligned and when said second and fourth axes are vertically aligned.

* * * * *